(12) United States Patent
Chen et al.

(10) Patent No.: US 12,465,745 B2
(45) Date of Patent: Nov. 11, 2025

(54) CENTRIFUGAL IMPELLER FOR BLOOD PUMP, AND BLOOD PUMP

(71) Applicant: Beihang University, Beijing (CN)

(72) Inventors: Zengsheng Chen, Beijing (CN); Yuan Li, Beijing (CN); Yubo Fan, Beijing (CN); Xiaoyan Deng, Beijing (CN)

(73) Assignee: Beihang University, Beijing (CN)

( * ) Notice: Subject to any disclaimer, the term of this patent is extended or adjusted under 35 U.S.C. 154(b) by 451 days.

(21) Appl. No.: 17/993,363

(22) Filed: Nov. 23, 2022

(65) Prior Publication Data

US 2023/0310831 A1 Oct. 5, 2023

(30) Foreign Application Priority Data

Mar. 29, 2022 (CN) .......................... 202210318493.8

(51) Int. Cl.
| | |
|---|---|
| *A61M 60/232* | (2021.01) |
| *A61M 60/113* | (2021.01) |
| *A61M 60/38* | (2021.01) |
| *A61M 60/419* | (2021.01) |
| *A61M 60/806* | (2021.01) |

(52) U.S. Cl.
CPC ........ *A61M 60/232* (2021.01); *A61M 60/113* (2021.01); *A61M 60/38* (2021.01); *A61M 60/419* (2021.01); *A61M 60/806* (2021.01)

(58) Field of Classification Search
CPC .. A61M 60/232; A61M 60/113; A61M 60/38; A61M 60/419; A61M 60/806; A61M 60/109; A61M 60/216; A61M 60/804; A61M 60/845
See application file for complete search history.

(56) References Cited

U.S. PATENT DOCUMENTS

| | | | | |
|---|---|---|---|---|
| 5,746,575 | A | * | 5/1998 | Westphal .............. F04D 29/242 415/206 |
| 6,053,705 | A | * | 4/2000 | Schob ................. F16C 32/0497 417/423.12 |
| 2021/0170081 | A1 | * | 6/2021 | Kanz .................... A61M 25/007 |

* cited by examiner

*Primary Examiner* — Jessica Arble
(74) *Attorney, Agent, or Firm* — John H. Choi & Associates (57) ABSTRACT

A centrifugal impeller for a blood pump, and a blood pump are provided. The centrifugal impeller comprises a circular base plate, centrifugal blades, and a supporting structure. A through hole is formed in the middle of the base plate to form a secondary flow path. The centrifugal blades are arranged on the upper surface of the base plate, each centrifugal blade is a banana-shaped blade which is thick in middle and thin at both ends, and a wrap angle of each centrifugal blade is greater than or equal to 90°, and the centrifugal blades extend radially from the outer edge of the through hole to the periphery of the base plate. The supporting structure comprises a supporting shaft arranged at the center of the through hole and supporting blades, one end of each supporting blade is connected to the supporting shaft, and another end is connected to the base plate.

14 Claims, 7 Drawing Sheets

CENTRIFUGAL IMPELLER FOR BLOOD PUMP, AND BLOOD PUMP

CROSS-REFERENCE TO RELATED APPLICATION

This patent application claims the benefit and priority of Chinese Patent Application No. CN202210318493.8 filed on Mar. 29, 2022, the disclosure of which is incorporated by reference herein in its entirety as part of the present application.

TECHNICAL FIELD

The present disclosure relates to the technical field of rotors, and in particular relates to a centrifugal impeller for a blood pump, and a blood pump.

BACKGROUND

Blood pump is a medical device capable of assisting in human blood circulation, which is often used for extracorporeal circulation support and heart failure treatment. The blood pump is also an important component of the Extracorporeal Membrane Oxygenation (ECMO) system. At present, the blood pump commonly used in clinical practice is a magnetic-coupling driven blood pump, in which a magnetically coupling drive motor outside a pump head drives a centrifugal impeller inside the pump head to rotate and thus promote the blood circulation. The high-speed rotation of the centrifugal impeller of the blood pump leads to the occurrence of turbulence in the impeller. On the one hand, the presence of the turbulence may affect the flow and decrease the hydraulic performance of the blood pump. On the other hand, the turbulence often contains large non-physiological shear stress, and furthermore, the turbulent disturbance on the flow field can also form a large number of flow stagnation zones. The place above the center of the centrifugal impeller is usually a place where the primary flow and the secondary flow impinge and intersect with each other, there are often large energy losses and higher non-physiological shear stress, which also leads to the decrease of the hydraulic performance of the blood pump. In addition, the blood flow velocity is low at a location below the center of the centrifugal impeller and near the secondary flow path, such that the blood is easy to stagnate in the secondary flow path region. The presence of the non-physiological shear stress may inevitably cause damage to blood cells and proteins (such as damaging the red blood cells and activating platelets), meanwhile the presence of the flow stagnation zone may lead to the blood stagnation, which further leads to the thrombosis. More seriously, once the thrombus occurs at the bearing, it is easy to damage the dynamic balance to cause rotor instability, which in turn leads to blood pump failure and may cause serious clinical accidents. Further, as modern centrifugal blood pumps mostly use magnetically coupling drive approach, when the rotor is started, or the rotational speed changes, it is very easy to generate a huge lift force, and in order to guarantee the smooth operation of the blood pump, such lift force needs to be accurately balanced with the liquid pressure that the rotor is subjected to.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

(1) Objective of the Present Disclosure

An objective of the present disclosure is to provide a centrifugal impeller for a blood pump, which may avoid or reduce blood damage or blood stagnation and improve the dynamic balance of a rotor.

(2) Technical Solution

To solve the problems above, in a first aspect, the embodiment of the present disclosure provides a centrifugal impeller for a blood pump, comprising:

a circular base plate, wherein a through hole is formed in a middle of the base plate to form a secondary flow path;

centrifugal blades arranged at an upper surface of the base plate, wherein each of the centrifugal blades is a banana-shaped blade which is thick in the middle and thin at two ends, a wrap angle of each centrifugal blade is greater than or equal to 90°, and the centrifugal blades extend radially from an outer edge of the through hole to a periphery of the base plate; and a supporting structure comprising a supporting shaft and supporting blades, wherein the supporting shaft is arranged at a center of the through hole, one end of each supporting blade is connected to the supporting shaft, and another end of each supporting blade is connected to the base plate.

In some embodiments, the supporting blades extend radially from a center of the top surface of the supporting shaft to an inner peripheral wall of the through hole.

In some embodiments, the centrifugal blades each comprise a blade tip part close to the supporting structure and a blade root part away from the supporting structure, and a height of the blade tip part is greater than a height of the blade root part.

In some embodiments, the centrifugal blades bend to a rotational direction of the centrifugal impeller, and a bending direction of the supporting blades is opposite to that of the centrifugal blades.

In some embodiments, a number of the centrifugal blades is greater than or equal to 3, and the centrifugal blades are evenly distributed in a circumferential direction of the through hole.

In some embodiments, a number of the supporting blades is greater than or equal to 3, and the supporting blades are evenly distributed in a circumferential direction of the through hole.

In some embodiments, a height of the centrifugal blades in an axis direction of the centrifugal impeller is greater than a depth of the through hole.

In some embodiments, a wrap angle of the supporting blades is greater than or equal to 10°.

In some embodiments, the supporting shaft is of an upward-protruding hemispherical shape.

In a second aspect, the embodiment of the present disclosure provides a blood pump, which comprises the centrifugal impeller for the blood pump according to any one of embodiments above.

(3) Beneficial Effects

The technical solution above of the present disclosure has the following beneficial technical effects:

By providing the banana-shaped blades which are thick in the middle and thin at the two ends on the upper surface of the base plates, non-physiological shear stress and damage to the blood caused by the narrow effective flow area of an inlet and an outlet of the impeller may be reduced. Further, the wrap angle of the blade is greater than or equal to 90°, which may play a role in restraining the flow in the impeller, and avoid a flow stagnation zone generated by flow separation in the impeller, thereby avoiding the thrombosis. By providing the supporting structure in the through hole of the base plate, the centrifugal impeller can be supported to rotate at a high speed and to keep balance in the rotating process, thereby enhancing the overall structural strength and stability. By providing the supporting blade, and enabling the bending direction of the supporting blade to be opposite to that of the centrifugal blade, the blood flow velocity in the secondary flow path can be increased to reduce the collision of the secondary flow and primary flow, thereby improving a flow field near the supporting shaft to avoid blood stagnation and thrombosis generation. Furthermore, the flow velocity increase in the secondary flow path can convert the pressure in the secondary flow path into velocity energy, such that the velocity in a lower cavity is increased to prevent the blood from stagnating in the cavity below, and the possibility of the thrombosis at the lower cavity is reduced. Furthermore, the reduction of the pressure energy of the lower cavity may reduce the upward lift force generated by the cavity below to the circular base plate and improve the dynamic balance of the rotor.

BRIEF DESCRIPTION OF THE DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:
1—base plate; 11—through hole;
2—centrifugal blade; 21—blade tip part; 22—blade root part;
3—supporting structure; 31—supporting shaft; 32—supporting blade;
4—housing; 41—base; 42—blood inlet; 43—first chamber; 44—second chamber; 45—third chamber.

DETAILED DESCRIPTION OF THE EMBODIMENTS

To make the objectives, technical solutions and advantages of the present disclosure clearer, the present disclosure is further described in detail in conjunction with specific embodiments and with reference to the accompanying drawings. It should be understood that these descriptions are only illustrative and are not intended to limit the scope of the present disclosure. In addition, in the following, well-known structures and technologies are not described to avoid obscuring the present disclosure unnecessarily.

The schematic diagrams according to the present disclosure are illustrated in the accompanying drawings. However, they are not drawn to scale, some features may be omitted for sake of clarity. Moreover, the various regions, and their relative sizes and positions shown in the drawings are also illustrative, and deviations may occur due to manufacture tolerances and technique limitations in practice. Those skilled in the art can also devise regions of different shapes, sizes, and relative positions as desired.

Apparently, the described embodiments are only part rather than all of the embodiments of the present disclosure. On the basis of the embodiments of the present disclosure, all other embodiments acquired by those of ordinary skill in the art without making inventive efforts fall within the scope of protection of the present disclosure.

In addition, the technical features involved in the different embodiments of the present disclosure described below may be combined with each other so long as they do not constitute a conflict with each other. The present disclosure will be described in more detail hereinafter with reference to the accompanying drawings. In various accompanying drawings, like reference numerals may refer to identical elements. For clarity, the individual sections in the accompanying drawings are not drawn to scale.

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left are used to describe the accompanying figures. The terminology includes the words above specifically mentioned, derivatives thereof, and words of similar import.

Figure 1:
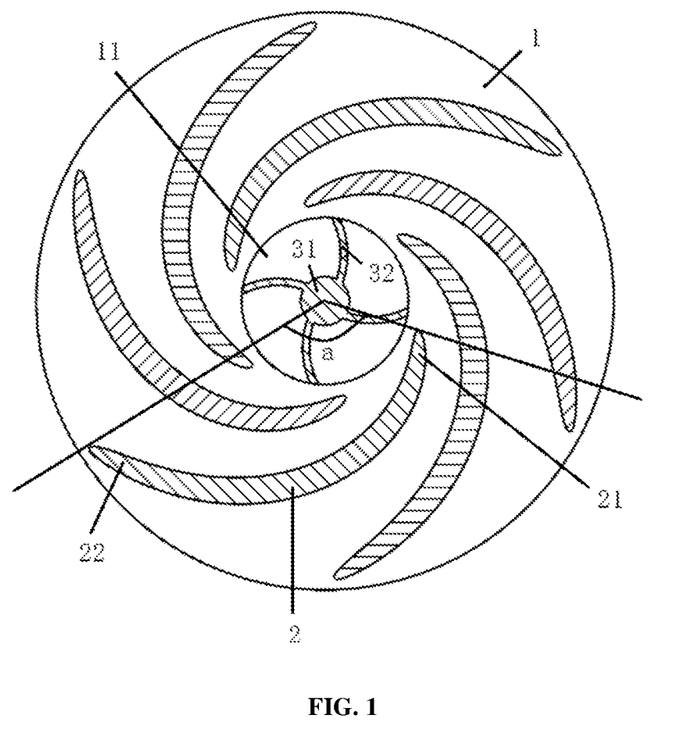
FIG. 1 is a structure diagram of a centrifugal impeller for a blood pump in accordance with an embodiment of the present disclosure.
Figure 2:
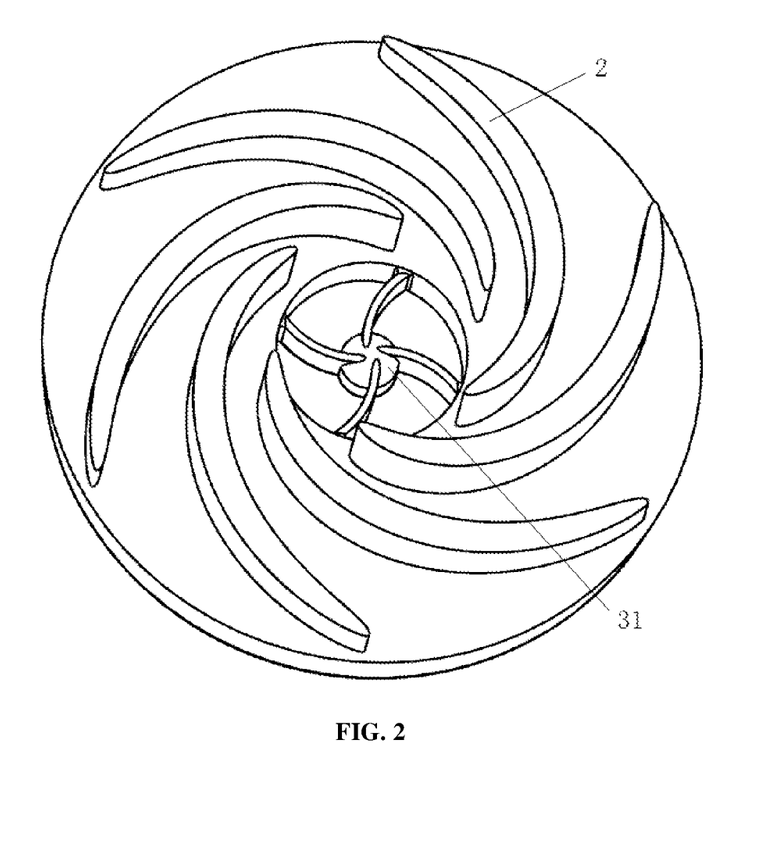
FIG. 2 is a perspective view of a centrifugal impeller for a blood pump in FIG. 1.

FIG. 1 is a structure diagram of a centrifugal impeller for a blood pump in accordance with an embodiment of the present disclosure, and FIG. 2 is a perspective view of a centrifugal impeller for a blood pump in FIG. 1. As shown in FIG. 1 and FIG. 2, in a first embodiment of the present disclosure, a centrifugal impeller 1 for a blood pump is provided, which comprises a base plate 1, centrifugal blades 2, and a supporting structure 3. The base plate 1 is circular, a permanent magnet is pre-embedded in the base plate 1, and the axis of the base plate 1 is the same as that of the centrifugal impeller. A through hole 11 is formed in the center of the base plate 1 to form a secondary flow path, the through hole 11 is circular, and the diameter of the secondary flow path is one tenth to one half of that of the base plate 1. The thickness of the base plate 1 gradually increases from the center to the periphery, the top surface of the base plate 1 is in the same horizontal plane, and the side surface of the base plate 1 extends downwards from the top surface and inclines towards an axis direction of the centrifugal impeller. The centrifugal blades 2 are arranged at the upper surface of the base plate 1, and the number of the centrifugal blades 2 is greater than or equal to 3. The centrifugal blades 2 radially extend from the outer edge of the through hole 11 to the periphery of the base plate 1, and the centrifugal blades 2 are evenly distributed in a circumferential direction of the base plate 1. The centrifugal blades 2 each bend towards a rotational direction of the centrifugal impeller so as to drive the blood to flow to the periphery of the base plate 1. The supporting structure 3 comprises a supporting shaft 31 and supporting blades 32. The supporting shaft 31 is arranged at the center of the through hole 11, one end of each supporting blade 32 is connected to the supporting shaft 31, and the other end of each supporting blade 31 is connected to the base plate 1. The number of the supporting blades 32 is greater than or equal to 3, and the supporting blades 32 are evenly distributed in a circumferential direction of the through hole 11. A bending direction of the supporting blade 32 is opposite to that of the centrifugal blades 2 so as to enable the blood to be gathered towards the center of the base plate.

By providing the supporting structure 3 in the through hole 11 of the base plate 1, the centrifugal impeller can be supported to rotate at a high speed and to keep dynamic balance in the rotating process, thereby enhancing the overall structural strength and stability. By providing the supporting blades 32, the blood flow velocity in the secondary flow path can be increased to avoid blood stagnation and thrombosis formation. Further, the flow velocity increases in the secondary flow path may convert the pressure in the secondary flow path into velocity energy to reduce the pressure of a lower cavity of the base plate 1, thereby reducing the flowing obstruction in the lower cavity of the base plate 1. In this case, on the one hand, it is guaranteed that the blood in the lower cavity of the base plate 1 may flow out smoothly, and the possibility of thrombosis in the lower cavity of the base plate 1 is reduced; and on the other hand, the pressure energy of the lower cavity of the base plate 1 is reduced due to the increase of the flow velocity in third chamber 45, such that the upward lift force generated by the lower cavity of the base plate 1 to a rotor is reduced, the dynamic balance of the rotor is further improved, and the stable operation of the whole blood pump is ensured.

In some embodiments, each centrifugal blade comprises a blade root part close to the through hole and a blade tip part extending towards a direction away from the through hole. The thickness of the blade root part gradually increases in a direction away from the through hole, and the thickness of the blade tip part gradually decreases in a direction away from the through hole. The width of the blade root part gradually increases in a direction away from the through hole, and the width of the blade tip part gradually decreases to zero in a direction away from the through hole. The centrifugal blade is a banana-shaped large-wrap-angle blade which is thick in middle and thin at two ends, and the height of the blade front edge (blade tip) close to a rotating center is greater than a blade tail edge (blade root) away from the centrifugal center. Such design may improve the blood flow near the impeller, reduce the damage to the blood caused by high-speed rotation of the impeller, and enhance the hydraulic performance of the blood pump. The providing of the banana-shaped blade configuration is conducive to reducing the shear stress at an inlet and an outlet of the impeller and avoiding blood damage. Further, due to the design of the large wrap angle, the restriction of the blade to the blood flow in the impeller is enhanced, and blood stagnation and thrombosis caused by flow separation in the impeller are avoided or reduced. Different from the conventional supporting blade, the wrap angle of each supporting blade in the present disclosure is greater than or equal to 10°, and the bending direction of the supporting blades is opposite to that of the centrifugal blades. Such design may reduce the collision of the secondary flow and the primary flow, improve the flow field near the rotor, and improve the compatibility of the blood in the blood pump. In accordance with the centrifugal impeller for the blood pump, by providing the supporting structure in the through hole of the base plate, the centrifugal impeller can be supported to rotate at a high speed and to keep balance in the rotating process, thereby enhancing the overall structural strength and stability. By providing the supporting blades, the blood flow velocity in the secondary flow path can be increased to avoid blood stagnation and thrombosis. Further, the flow velocity increase in the secondary flow path may convert the pressure in the secondary flow path into velocity energy, such that the pressure of the lower cavity of the base plate is reduced, the lift force of the lower cavity to the bottom plate is avoided or reduced, and the dynamic balance of the rotor is improved.

In some embodiments, the centrifugal blade 2 comprises a blade tip part 21 close to the through hole 11, and a blade root part 22 extending towards a direction away from the through hole 11, and the height of the blade tip part 21 is greater than the height of the blade root part 22. The thickness of the blade tip part 21 gradually increases in a direction away from the through hole 11, and the thickness of the blade root part 22 gradually decreases in a direction away from the through hole 11. The width of the blade tip part 21 gradually increases in a direction away from the through hole 11, and the blade root part 22 gradually decreases to zero in a direction away from the through hole 11. The banana-shaped blade design is conducive to increasing the effective flow area at an inlet region and an outlet region of the impeller, thereby reducing the flow velocity gradient and shear stress near the inlet region and the outlet region to avoid or reduce the damage to the blood. An included angle a (a wrap angle of the blade) between one of the blade tip part 21 and blade root part 22 and the rotating center of the impeller is greater than or equal to 90° to enhance the restriction on the flow in the impeller, thereby avoiding the blood damage and flow stagnation zone caused by flow separation in the impeller. In some embodiments, the wrap angles of the centrifugal blade 2 is greater than or equal to 100°, and less than or equal to 150°. Further, the design of the banana-shaped blade with the wrap angle greater than or equal to 90° is also conducive to enhancing the hydraulic performance of the blood pump while improving the flow.

In some embodiments, the supporting blades 32 extend radially from the center of the top surface of the supporting shaft 31 to an inner circumferential wall of the through hole 11, the width of each supporting blade 21, in an extending direction, gradually increases to be twice the depth of the through hole 11 and then gradually decreases. The supporting blades 32 are of a curved-arc shape, and have a bending direction opposite to that of the blades 2.

Figure 3:
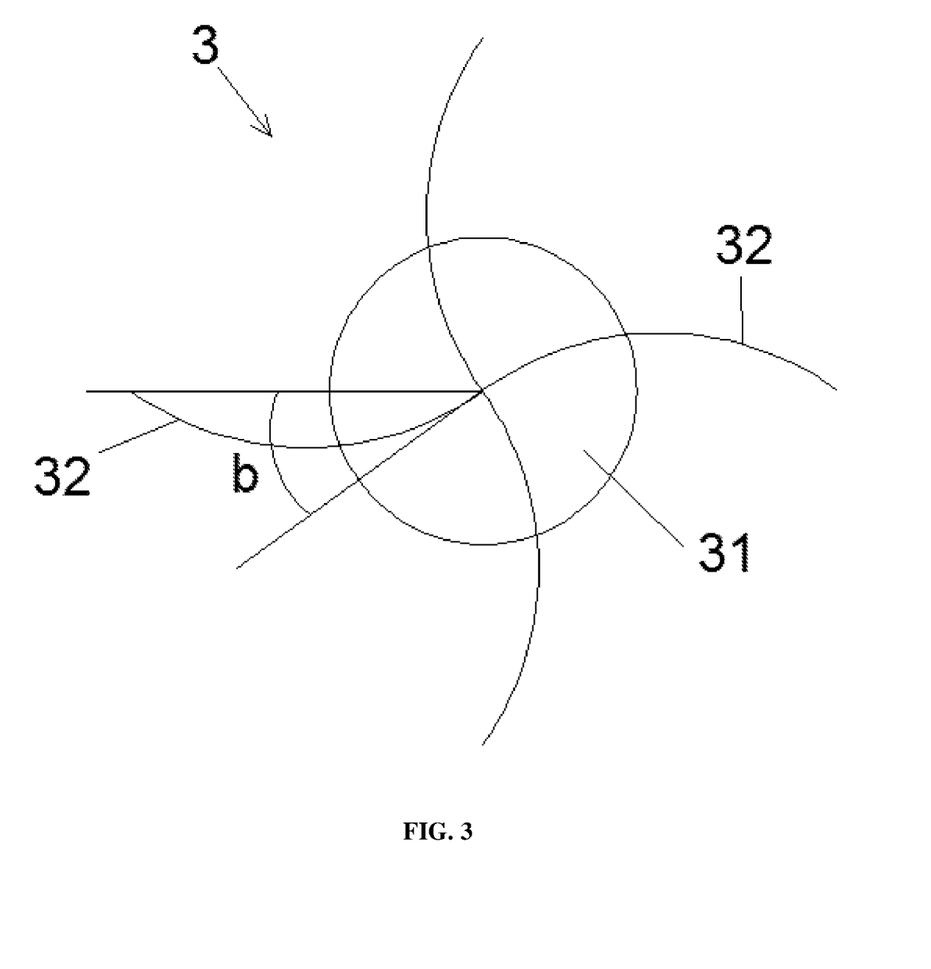
FIG. 3 is a structure diagram of a supporting structure in accordance with an embodiment of the present disclosure.

FIG. 3 is a structure diagram of a supporting structure in accordance with an embodiment of the present disclosure. As shown in FIG. 3, the wrap angle b of each supporting blade is greater than or equal to 10° to enhance the restriction on the blood flow in the through hole 11, to avoid the generation of a flow stagnation zone above the supporting shaft 31, and to reduce the probability of thrombosis. In some embodiments, the wrap angle b of the blade is greater than or equal to 10° and less than or equal to 100°.

Figure 4:
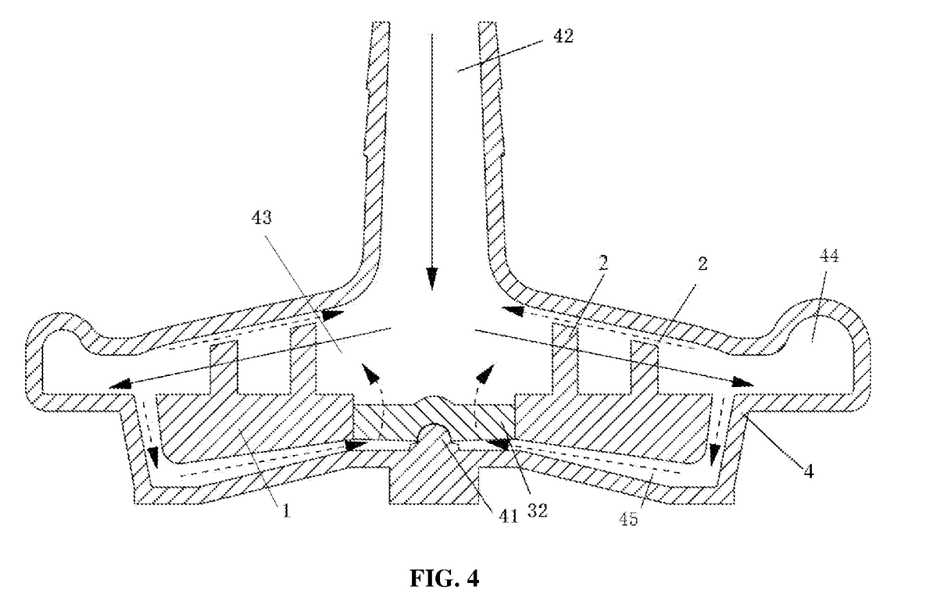
FIG. 4 is a structure diagram of a blood pump in accordance with an embodiment of the present disclosure.

FIG. 4 is a structure diagram of a blood pump in accordance with an embodiment of the present disclosure. As shown in FIG. 4, the blood pump comprises a housing 4 and a centrifugal impeller arranged in the housing 4. The center of the bottom surface of the housing 4 comprises an upward-protruding base 41, the bottom surface of a supporting shaft 31 of the centrifugal impeller comprises a groove in fit with the base 41, and the centrifugal impeller is supported on the base 41 by means of the groove. A magnetic levitation element is provided below the bottom surface of the housing 4. The magnetic levitation element is configured to control the permanent magnet in the centrifugal impeller to rotate, thus driving the centrifugal impeller to rotate. The center of the top surface of the housing 4 comprises a blood inlet 42, and the housing 4 internally comprises a first chamber 43, a second chamber 44, and a third chamber 45. The first chamber 43 is arranged above the centrifugal impeller, the second chamber 44 is annular and arranged above the periphery of the centrifugal impeller, and the third chamber 45 is arranged below the centrifugal impeller. Arrows denote flowing directions of the blood. During the rotating process of the centrifugal impeller, the blood is sucked in from the blood inlet 42 to enter the first chamber 43, and then the blood in the first chamber 43 flows into the second chamber 44 to form the primary flow after being accelerated by the centrifugal impeller. The design of the banana-shaped blade with the wrap angle greater than or equal to 90° may reduce the high shear stress in the first chamber 43 and regulate the flow of the blood in the first chamber 43, thereby improving the hydraulic performance of the blood pump and reducing or avoiding the blood damage caused by non-physiological shear stress in the first chamber 43 and the blood stagnation and thrombosis caused by flow stagnation. Due to the pressure difference among the first chamber 43, the second chamber 44, and the third chamber 45, a portion of blood in the second chamber 44 flows back to the first chamber 43 or the third chamber 45. The blood in the third chamber 45 returns to the first chamber 43 from the secondary flow path to form a secondary flow, and as the blood in the secondary flow is low in flow velocity, the blood stagnation is easy to occur near the third chamber 45 and the supporting shaft 31, resulting in the thrombosis that, once formed, may destroy the dynamic balance of the rotor, leading to the failure of the blood pump. In addition, the blood in the secondary flow may collide with the blood in the primary flow when entering the first chamber 43, which may reduce the hydraulic performance of the blood pump. The collision of the primary flow and the secondary flow at the top surface of the supporting shaft 31 results in energy loss and non-physiological shear stress, which is easy to damage the blood cells and proteins, such as destruction of red blood cells and activation of platelets. In accordance with this embodiment, the providing of the plurality of centrifugal blades 2 is conducive to increasing the flow velocity of the secondary flow and avoiding the thrombosis formation caused by blood stagnation. The supporting blade 32 bends towards a direction opposite to that of the centrifugal blade 2, such that the blood in the secondary flow is gathered towards the center of the top surface of the supporting shaft 31, the collision of the secondary flow and the primary flow is reduced, the compatibility of the blood in the blood pump is improved, and then the incidence of complications during clinical blood circulation assistance is reduced.

Figure 5:
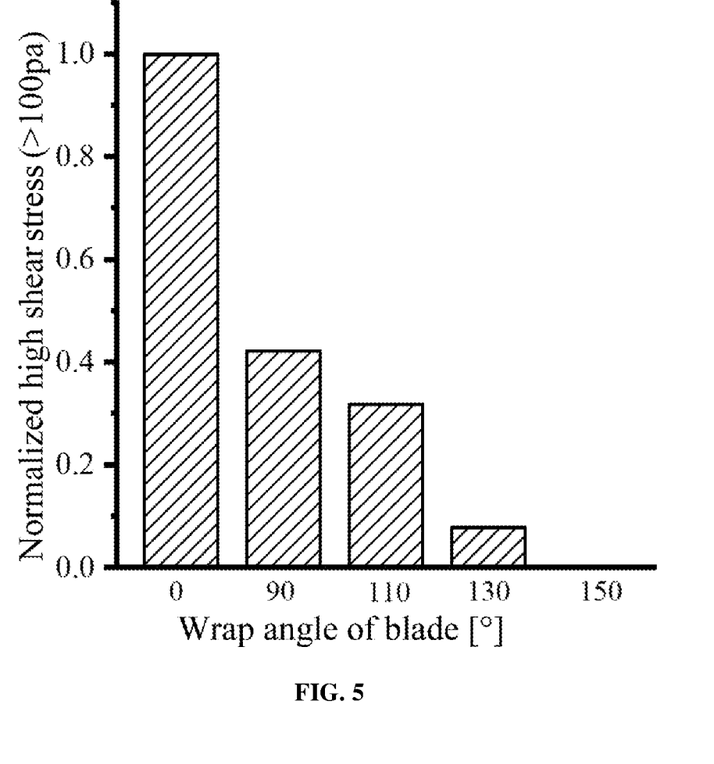
FIG. 5 is a schematic diagram of a relationship between a wrap angle of a centrifugal blade of a blood pump and a shear stress in accordance with an embodiment of the present disclosure.
Figure 6:
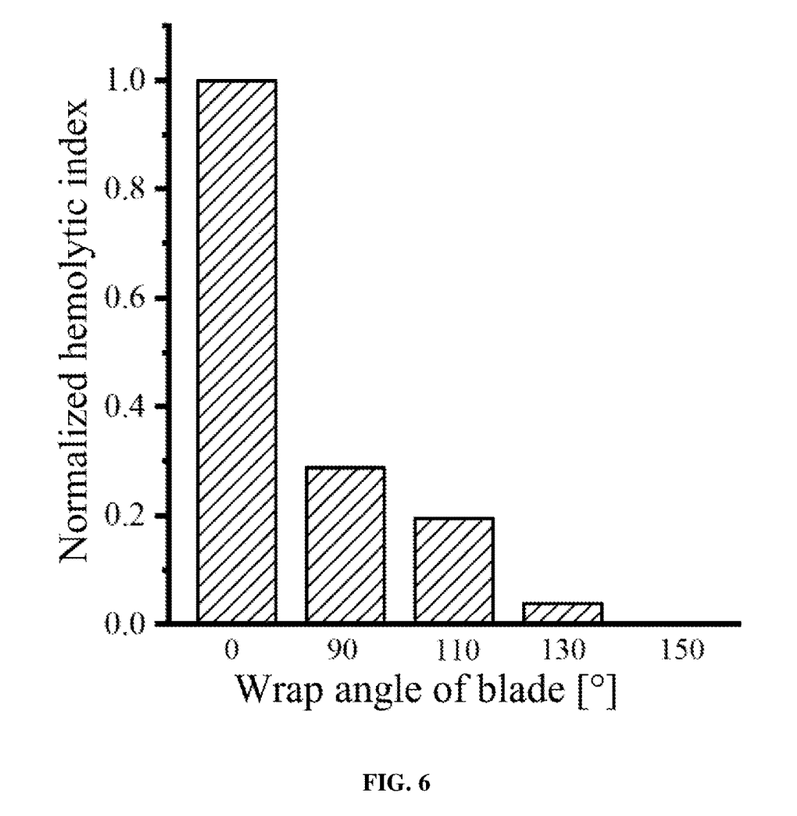
FIG. 6 is a schematic diagram of a relationship between a wrap angle of a centrifugal blade of a blood pump and a hemolysis index in accordance with an embodiment of the present disclosure.
Figure 7:
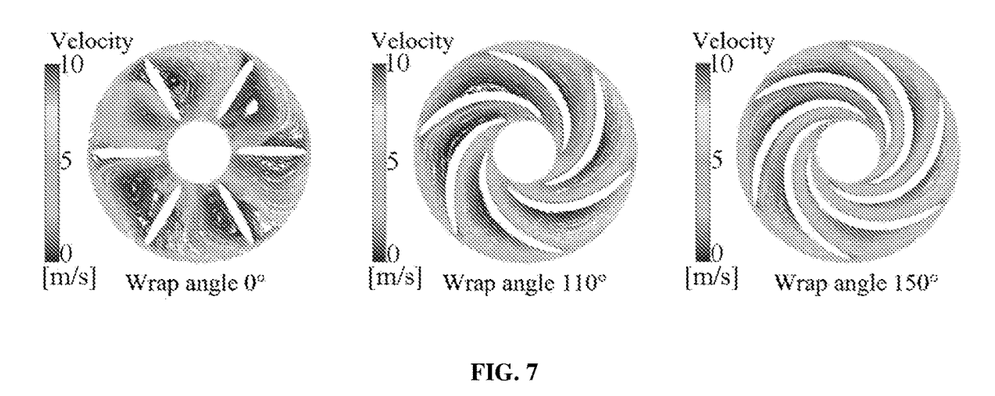
FIG. 7 is a schematic diagram of a blood flow velocity distribution of a blood pump in accordance with an embodiment of the present disclosure.
Figure 8:
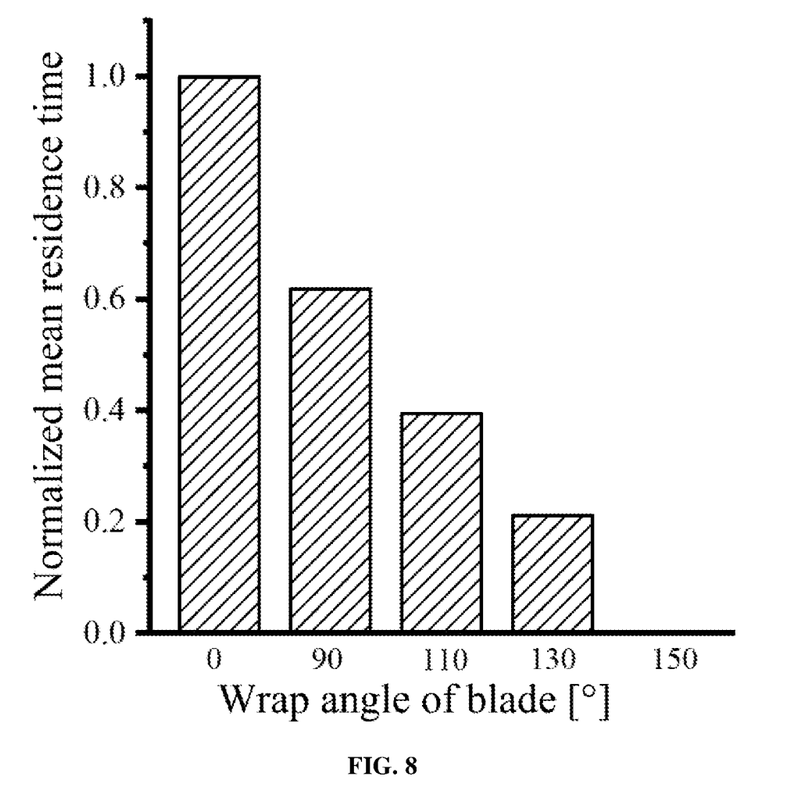
FIG. 8 is a schematic diagram of a relationship between a wrap angle of a centrifugal blade of a blood pump and average resident time of blood in accordance with an embodiment of the present disclosure.
Figure 9:
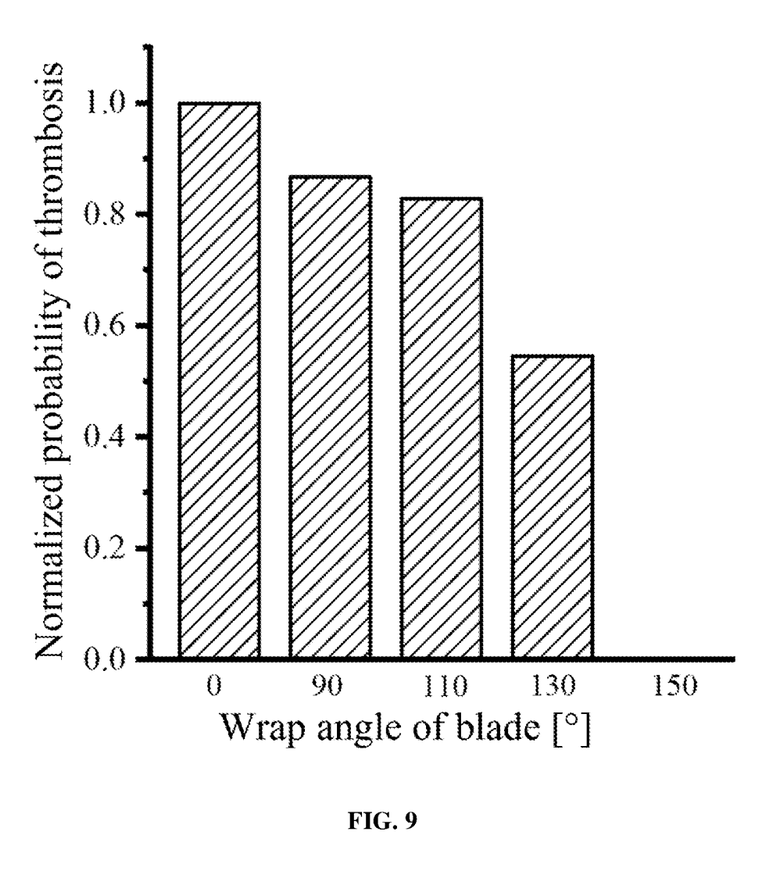
FIG. 9 is a schematic diagram of a relationship between a wrap angle of a centrifugal blade of a blood pump and probability of thrombosis in accordance with an embodiment of the present disclosure.

FIG. 5 is a schematic diagram of a relationship between a wrap angle of a centrifugal blade of a blood pump and a shear stress in accordance with an embodiment of the present disclosure. FIG. 6 is a schematic diagram of a relationship between a wrap angle of a centrifugal blade of a blood pump and a hemolysis index in accordance with an embodiment of the present disclosure. FIG. 7 is a schematic diagram of a blood flow velocity distribution of a blood pump in accordance with an embodiment of the present disclosure. FIG. 8 is a schematic diagram of a relationship between a wrap angle of a centrifugal blade of a blood pump and average resident time of blood in accordance with an embodiment of the present disclosure. FIG. 9 is a schematic diagram of a relationship between a wrap angle of a centrifugal blade of a blood pump and probability of thrombosis in accordance with an embodiment of the present disclosure.

FIG. 5 is a schematic diagram of a relationship between a wrap angle of a centrifugal blade of a blood pump and a shear stress in accordance with an embodiment of the present disclosure. As shown in FIG. 5, the abscissa is a wrap angle of a centrifugal blade 2, the ordinate is a normalized volume of the blood subjected to the shear stress greater than 100 Pa in the blood pump. The greater the shear stress on the blood, the larger the damage to the blood. The experimental data shows that, with the increase of the wrap angle, the volume occupied by the non-physiological shear stress greater than 100 Pa gradually decreases, and the damage to the red blood cells gradually reduces. The volume occupied by the non-physiological shear stress greater than 100 Pa decreases slightly until the wrap angle is increased to 90°. When the wrap angle is increased to the critical angles of 90° and 130°, the volume occupied by the non-physiological shear stress greater than 100 Pa decreases significantly. When the wrap angle is greater than 150°, non-physiological shear stress greater than 100 Pa exists. The experimental results show that the increase of the wrap angle of the centrifugal angle is conducive to reducing the damage to the red blood cells.

FIG. 6 is a schematic diagram of a relationship between a wrap angle of a centrifugal blade of a blood pump and a hemolysis index in accordance with an embodiment of the present disclosure. As shown in FIG. 6, the abscissa is a wrap angle of a centrifugal blade 2, the ordinate is a normalized hemolysis index. The lower the hemolysis index of the blood, the better the performance of the blood pump. The damage to the red blood cells may cause the rise of the hemolysis index. The experimental data shows that, with the increase of the wrap angle, the hemolysis index of the blood decreases gradually. The hemolysis index of the blood decreases slightly until the wrap angle is increased to 90°. When the wrap angle is increased to the critical angle of 90°, the hemolysis index decreases significantly, and with the increase of the wrap angle, the hemolysis index continues to decrease. The experimental results show that the increase of the wrap angle of the centrifugal angle is conductive to reducing the hemolysis index.

FIG. 7 is a schematic diagram of a blood flow velocity distribution of a blood pump in accordance with an embodiment of the present disclosure. As shown in FIG. 7, when the wrap angle is 0°, there is a large amount of flow separation in the flow path of the impeller, the flow velocity distribution evenness of the blood is poor; the flow velocity distribution evenness of the blood at the wrap angle of 110° is better than that at the wrap angle of 0°; and the flow velocity distribution evenness of the blood at the wrap angle of 150° is better than that at the wrap angle of 110°. The experimental data shows that the increase of the wrap angle of the centrifugal blade is conducive to restraining flow separation and regulating the flow of the blood in the impeller.

FIG. 8 is a schematic diagram of a relationship between a wrap angle of a centrifugal blade of a blood pump and average resident time of the blood in accordance with an embodiment of the present disclosure. As shown in FIG. 8, the abscissa is a wrap angle of a centrifugal blade 2, the ordinate is a normalized average resident time of blood. The shorter the average resident time of the blood, the lower the probability of thrombosis, and the better the performance of the blood pump. The experimental data shows that, with the increase of the wrap angle, the average resident time of the blood reduces gradually. The experimental data showed that the increase of the wrap angle is conducive to reducing the average resident time of the blood.

FIG. 9 is a schematic diagram of a relationship between a wrap angle of a centrifugal blade of a blood pump and probability of thrombosis in accordance with an embodiment of the present disclosure. As shown in FIG. 9, the abscissa is a wrap angle of a centrifugal blade 2, the ordinate is the probability of thrombosis. The experimental data shows that, with the increase of the wrap angle, the probability of thrombosis decreases gradually. When the wrap angle is increased to the critical angle of 110°, the probability of the thrombosis decreases significantly. The experimental result showed that the increase of the wrap angle of the centrifugal blade is conducive to reducing the probability of thrombosis.

The present disclosure has been described above with reference to embodiments thereof. However, these examples are for illustrative purposes only and are not intended to limit the scope of the present disclosure. The scope of the present disclosure is defined by the appended claims and their equivalents. Numerous substitutions and modifications may be made by those skilled in the art without departing from the scope of the present disclosure, all of which are intended to fall within the scope of the present disclosure.

What is claimed is:

1. A centrifugal impeller for a blood pump, comprising:
    a base plate that is circular, wherein a through hole is formed in a middle of the base plate to form a secondary flow path;
    centrifugal blades arranged at an upper surface of the base plate, wherein each of the centrifugal blades is a banana-shaped blade which is thick in middle and thin at two ends, a wrap angle of each centrifugal blade is greater than or equal to 90°, and the centrifugal blades extend radially from an outer edge of the through hole to a periphery of the base plate;
    a supporting structure, comprising a supporting shaft and supporting blades, wherein the supporting shaft is arranged at a center of the through hole, one end of each supporting blade is connected to the supporting shaft, and another end of each supporting blade is connected to the base plate;
    wherein, the supporting blades extend radially from a center of the top surface of the supporting shaft to an inner peripheral wall of the through hole; and
    wherein, the centrifugal blades bend to a rotational direction of the centrifugal impeller, and a bending direction of the supporting blades is opposite to that of the centrifugal blades.

2. The centrifugal impeller for the blood pump according to claim 1, wherein, the centrifugal blades each comprise a blade tip part close to the supporting structure and a blade root part away from the supporting structure, and a height of the blade tip part is greater than a height of the blade root part.

3. The centrifugal impeller for the blood pump according to claim 1, wherein, a number of the centrifugal blades is greater than or equal to 3, and the centrifugal blades are evenly distributed in a circumferential direction of the through hole.

4. The centrifugal impeller for the blood pump according to claim 1, wherein, a number of the supporting blades is greater than or equal to 3, and the supporting blades are evenly distributed in a circumferential direction of the through hole.

5. The centrifugal impeller for the blood pump according to claim 1, wherein, a height of the centrifugal blades in an axis direction of the centrifugal impeller is greater than a depth of the through hole.

6. The centrifugal impeller for the blood pump according to claim 1, wherein, a wrap angle of the supporting blades is greater than or equal to 10°.

7. The centrifugal impeller for the blood pump according to claim 1, wherein, the supporting shaft is of an upward-protruding hemispherical shape.

8. A blood pump comprising a centrifugal impeller, the centrifugal impeller comprising:
    a base plate that is circular, wherein a through hole is formed in a middle of the base plate to form a secondary flow path;
    centrifugal blades arranged at an upper surface of the base plate, wherein each of the centrifugal blades is a banana-shaped blade which is thick in middle and thin at two ends, a wrap angle of each centrifugal blade is greater than or equal to 90°, and the centrifugal blades extend radially from an outer edge of the through hole to a periphery of the base plate; and
    a supporting structure, comprising a supporting shaft and supporting blades, wherein the supporting shaft is arranged at a center of the through hole, one end of each supporting blade is connected to the supporting shaft, and another end of each supporting blade is connected to the base plate;
    wherein, the supporting blades extend radially from a center of the top surface of the supporting shaft to an inner peripheral wall of the through hole; and
    wherein, the centrifugal blades bend to a rotational direction of the centrifugal impeller, and a bending direction of the supporting blades is opposite to that of the centrifugal blades.

9. The blood pump of claim 8, wherein the centrifugal blades each comprise a blade tip part close to the supporting structure and a blade root part away from the supporting structure, and a height of the blade tip part is greater than a height of the blade root part.

10. The blood pump of claim 8, wherein a number of the centrifugal blades is greater than or equal to 3, and the centrifugal blades are evenly distributed in a circumferential direction of the through hole.

11. The blood pump of claim 8, wherein a number of the supporting blades is greater than or equal to 3, and the supporting blades are evenly distributed in a circumferential direction of the through hole.

12. The blood pump of claim 8, wherein a height of the centrifugal blades in an axis direction of the centrifugal impeller is greater than a depth of the through hole.

13. The blood pump of claim 8, wherein a wrap angle of the supporting blades is greater than or equal to 10°.

14. The blood pump of claim 8, wherein the supporting shaft is of an upward-protruding hemispherical shape.

* * * * *